United States Patent [19]
Haas et al.

[11] 3,888,970
[45] June 10, 1975

[54] DOUBLE LAYER CATALYST BED FOR REMOVING $SO_2$ FROM WASTE GASES
[75] Inventors: Larry A. Haas, Burnsville; Sanaa E. Khalafalla; Thomas H. McCormick, both of Minneapolis, all of Minn.
[73] Assignee: The United States of America as represented by the Secretary of the Interior, Washington, D.C.
[22] Filed: Feb. 12, 1973
[21] Appl. No.: 331,726

[52] U.S. Cl. .................. 423/244; 423/569; 423/570
[51] Int. Cl. ........................ B01d 53/34; C01b 17/04
[58] Field of Search ........... 423/570, 569, 567, 242, 423/244, 659

[56] References Cited
UNITED STATES PATENTS
| | | |
|---|---|---|
| 2,631,921 | 3/1953 | Odell ................................. 423/659 |
| 2,785,056 | 3/1957 | Thumm et al. ..................... 423/570 |
| 3,199,955 | 8/1965 | West et al. ........................ 423/570 |
| 3,615,219 | 10/1971 | Budinkas .......................... 423/570 |
| 3,653,833 | 4/1972 | Watson et al. .................... 423/570 |

*Primary Examiner*—Oscar R. Wertiz
*Assistant Examiner*—Brian E. Hearn

[57] ABSTRACT

Dry waste gas containing $SO_2$ and CO is passed through a double layer bed of catalyst at 400°C. First layer consists of iron, chromium, nickel, manganese, or cobalt, supported on alumina. Second layer consists of alumina.

6 Claims, 3 Drawing Figures

3,888,970

DOUBLE LAYER CATALYST BED FOR REMOVING SO₂ FROM WASTE GASES

This invention relates to the removal of sulfur dioxide from waste gases.

Sulfur dioxide is a constituent of many waste gases, including gases from (1) fossil fuel (e.g., coal) burners, (2) sulfide ore processing as roasters, smelters and converters, (3) sour petroleum gas refineries, (4) paper mills, and (5) sulfuric acid manufacturing plants. Even though present in low concentration, the sulfur oxides contaminate the atmosphere, and must be removed in order to prevent adverse effects on human life, plant life, building materials, etc.

Present commercial methods for removing low concentrations (<5%) of sulfur dioxide from waste gases involve two steps: (1) adsorption in bulky solids or liquids, and (2) desorption and regeneration of the sorbent.

Additionally, catalytic reduction beds have previously been used for producing sulfur from $SO_2$. Heretofore, the most effective bed constituted a metal such as iron supported on alumina.

We have now developed a new and improved catalytic bed. Our invention comprises passing a dry $SO_2$-containing gas through a single catalytic bed composed of two layers of different catalysts, the first layer of which consists of a metal such as iron, chromium, or nickel, supported on γ-alumina, while the second layer consists of γ-alumina. With CO as a reductant, a catalyst bed temperature of about 400°C is employed. $SO_2$-containing gas enters the bed through the first layer and product gas leaves the bed from the second layer.

In comparison to the product gas of a bed of iron supported on alumina at an operating temperature of 400°C, the double-layer bed of the present invention can result in a product gas containing less than ⅛ the amount of gaseous sulfur compounds.

It is therefore an object of the present invention to remove $SO_2$ from a waste gas.

Another object is to catalytically convert said $SO_2$ to S.

A further object is to effect said conversion in a double-layer bed.

Other objects and advantages will be obvious from the following more detailed description of the invention taken in conjunction with the drawings in which.

Figure 1:
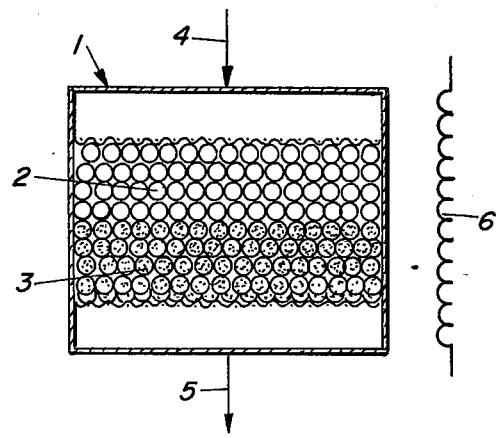
FIG. 1 illustrates a double-layer bed.

Referring to the FIG. 1, reference numeral 1 designates a reactor tube containing a packed catalyst bed composed of two layers 2 and 3. Layer 2 consists of metal supported on γ-alumina while layer 3 consists of γ-alumina. The following metals (supported on alumina) are suitable for layer 2: Fe, Cr, Ni, Co, or Mn. Iron is preferred.

Dry, CO-, $SO_2$-containing gas enters the bed through conduit 4, passes first through layer 2, then through layer 3, and product gas exits from the bed through conduit 5. The bed is preferably made up of pellets. A heater or furnace 6 heats the reactor tube to the operating temperature (about 400°C).

Gaseous elemental sulfur is removed from the product gas in the prior art manner (e.g., condensation).

$SO_2$ and CO preferably are present in the feed gas in a CO:$SO_2$ mole ratio of 2:1. Besides inert constituents, other compounds such as $CO_2$ (at <20 percent) or $O_2$ (at <0.5 percent) can also be present. Nitrogen and other inert gases exert no deleterious effects. Small quantities of higher oxides of sulfur and nitrogen can simultaneously be reduced on the catalyst. Optimum gas throughputs are best determined experimentally.

Most efficient utilization of the bed constituents is attained when layers 2 and 3 are respectively present in about a 2:1 weight ratio.

The following example compares the catalyst bed of the present invention with the prior art.

EXAMPLE 1

Iron alumina catalyst was prepared by pelletizing a mixture of minus 10 micron ferric oxide and minus 0.05 micron gamma alumina into minus 16-plus 20-mesh pellets. The pellets were indurated at 1,200°C for 2 hours and reduced at 600°C for 1 hour with hydrogen. A two-gram sample of the catalyst (ferric oxide was completely reduced) was placed in reactor tubes, and a gas containing 4.7 vol. % $SO_2$, 10% CO (the remainder nitrogen) was passed over the sample at varying temperatures. The percentage of gaseous sulfur compounds in the product gas was determined and plotted against reactor temperature. The results are shown in curve *a* of FIG. 2.

EXAMPLE 2

In a second series of tests one gram of the pelletized catalyst as prepared in example 1 was placed in a reactor tube. In addition, 1 gram of 0.05 micron gamma alumina, which had been pelletized into minus 16-plus 20-mesh size was also placed in the same reactor tube forming a dual-layer bed of catalyst as shown in FIG. 1. A gas having the same composition as shown in example 1 was passed through the bed at varying temperatures. The results are shown as curve *b* in FIG. 2.

Figure 2:
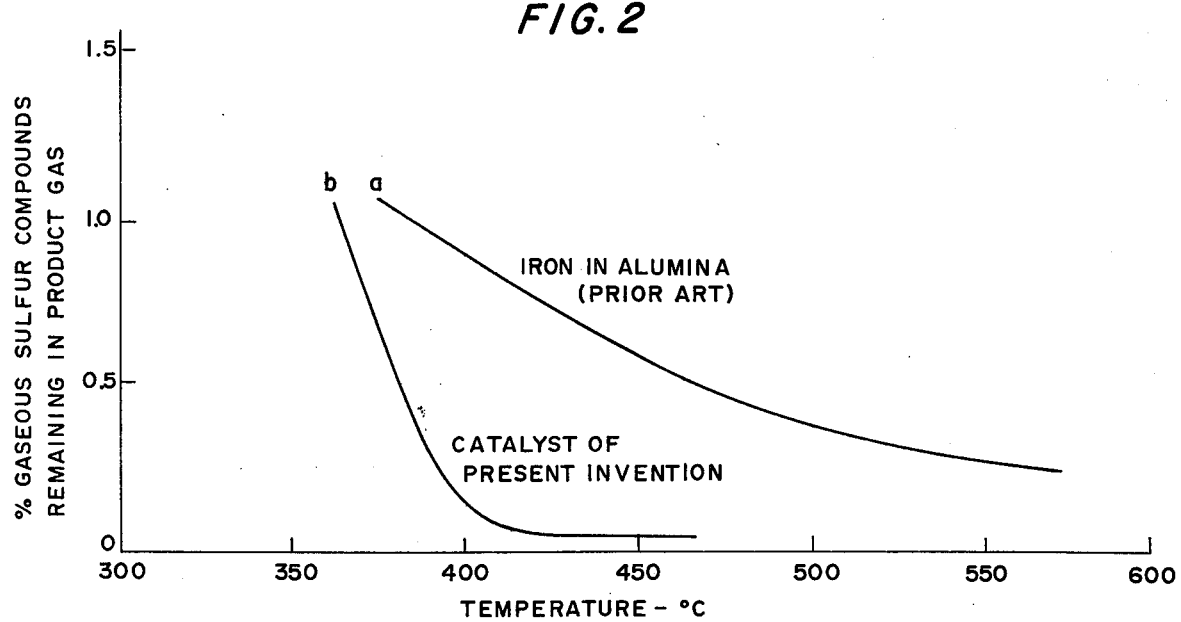
FIG. 2 is a graph comparing the present invention with the prior art.

Referring to FIG. 2, it can be seen the gaseous sulfur compounds in the feed gas are reduced to minimal concentration by the catalyst bed of the present invention at a temperature of about 400°C, while a single-layer iron-alumina catalyst bed requires temperatures above 550°C to even approach minimal concentration.

Figure 3:
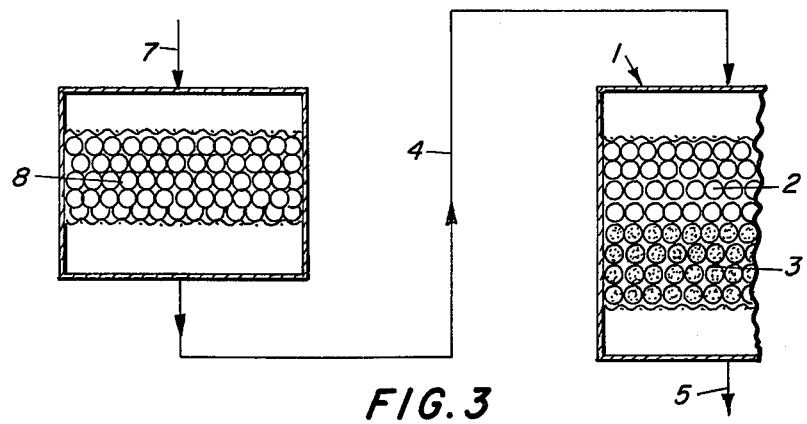
FIG. 3 is a modification of FIG. 1.

Referring now to FIG. 3, therein is shown a further modification of the present invention wherein a dry gas in conduit 7 containing little or no CO is passed through a coke bed 8 at a temperature of about 500°C to produce the necessary CO for the catalysis in the dual-layer bed in reactor tube 1.

One theory advanced in explanation of the present invention is that the first layer of the dual-layer bed favors the rapid production of sulfide intermediates, which rapidly react to form elemental sulfur in the presence of the catalyst in the second layer, although the improved results of the present invention are not attained when the pellets of the two layers are intimately intermixed.

What is claimed is:

1. A process for removing $SO_2$ from a dry waste gas comprising passing said waste gas through a single bed of catalyst said bed having a temperature of about 400°C in the presence of CO; said CO and $SO_2$ being present in a CO:$SO_2$ mole ratio of at least 2:1; said bed consisting of a first and second layer of catalyst, said first layer consisting of iron, chromium, nickel, cobalt or manganese supported on alumina, said second layer consisting of alumina; and wherein said gas enters said bed through said first layer, passes therethrough into said second layer, and exits from said bed from said second layer.

2. The process of claim 1 wherein said first layer is iron supported on alumina.

3. The process of claim 1 wherein said waste gas is first passed through a coke bed at a temperature of about 500°C so as to produce said CO.

4. The process of claim 3 wherein said first layer is iron supported on alumina.

5. The process of claim 1 wherein said first and second layers are present in a weight ratio of about 2:1.

6. The process of claim 4 wherein said first and second layers are present in a weight ratio of about 2:1.

* * * * *